United States Patent
Ohrenstein (10) Patent No.: US 12,094,156 B2
(45) Date of Patent: Sep. 17, 2024

(54) GAZE DIRECTION DETERMINATION APPARATUS

(71) Applicant: Robert Ohrenstein, Jerusalem (IL)

(72) Inventor: Robert Ohrenstein, Jerusalem (IL)

( * ) Notice: Subject to any disclaimer, the term of this patent is extended or adjusted under 35 U.S.C. 154(b) by 42 days.

(21) Appl. No.: 18/102,728

(22) Filed: Jan. 29, 2023

(65) Prior Publication Data

US 2023/0252668 A1 Aug. 10, 2023

(30) Foreign Application Priority Data

Feb. 7, 2022 (EP) ..................................... 22155499

(51) Int. Cl.
*G06T 7/70* (2017.01)
*G08G 1/005* (2006.01)
*G08G 1/16* (2006.01)
*H04N 23/90* (2023.01)

(52) U.S. Cl.
CPC ............... *G06T 7/70* (2017.01); *G08G 1/005* (2013.01); *G08G 1/166* (2013.01); *H04N 23/90* (2023.01); *G06T 2207/30201* (2013.01); *G06T 2207/30236* (2013.01); *G06T 2207/30252* (2013.01); *G06T 2207/30268* (2013.01)

(58) Field of Classification Search
CPC ............. G06T 7/70; G06T 2207/30201; G06T 2207/30236; G06T 2207/30252; G06T 2207/30268; H04N 23/90; G08G 1/005; G08G 1/166
USPC .......................................................... 348/78
See application file for complete search history.

(56) References Cited

U.S. PATENT DOCUMENTS

| | | |
|---|---|---|
| 5,686,942 A | 11/1997 | Ball |
| 10,821,886 B1 | 11/2020 | Breedvelt-Schouten |
| 2009/0022368 A1 | 1/2009 | Matsuoka |
| 2020/0065978 A1* | 2/2020 | Jales Costa .......... G06V 10/435 |
| 2020/0247434 A1* | 8/2020 | Kim ........................ G08G 1/166 |
| 2020/0324704 A1* | 10/2020 | Phillips ................. B60Q 1/2665 |
| 2021/0199431 A1* | 7/2021 | Barbier ..................... G01C 3/06 |
| 2021/0394793 A1* | 12/2021 | Austin .................. G08G 1/0112 |
| 2021/0397859 A1* | 12/2021 | Arora ..................... G06V 40/19 |
| 2022/0036736 A1* | 2/2022 | Mikuriya ................. G08G 1/09 |
| 2022/0111792 A1* | 4/2022 | Burmistrov ....... B60W 30/0956 |
| 2022/0126864 A1* | 4/2022 | Moustafa .............. G06T 1/0007 |
| 2023/0059370 A1* | 2/2023 | Mao ..................... B60W 60/001 |
| 2023/0136285 A1* | 5/2023 | Chujo ................... H04W 28/12 370/329 |
| 2023/0386326 A1* | 11/2023 | Schneemann .......... G06V 40/20 |

* cited by examiner

*Primary Examiner* — Matthew David Kim
(74) *Attorney, Agent, or Firm* — AlphaPatent Associates Ltd.; Daniel J. Swirksy (57) ABSTRACT

A gaze direction determination apparatus (10), including at least one camera for determining gaze direction of at least one person, the apparatus characterized by including a first camera (12A) for being installed above a driver (28A), for capturing the nose (20) thereof from above the nose, at least a second camera (12B) installed above at least a second person (28B) for capturing at least one nose (20) of at least a second person from above the nose, and a controller(59) for processing captures of the first (12A) and the at least second cameras (12B), for determining human communication in case the nose (20) of the driver (28A) as captured from above, and the nose (20) of the at least second person (28B) as captured from above, are horizontally directed (54A,54B) one (54A) towards the other (54B).

5 Claims, 7 Drawing Sheets

GAZE DIRECTION DETERMINATION APPARATUS

CROSS-REFERENCE TO RELATED APPLICATIONS

This application claims the benefit of priority from European Patent Application No. EP22155499.1, filed Feb. 7, 2022, the disclosure of which is incorporated herein by reference.

TECHNICAL FIELD

The invention relates to the field of gaze direction determination for traffic and other uses.

BACKGROUND

When a pedestrian intends to cross a road, for example, at a crosswalk, and sees a vehicle approaching, he does not know whether the vehicle intends to stop before the pedestrian crossing or not.

This can cause accidents and injuries to the body and property.

There is a long felt need to provide a solution to the above-mentioned and other problems of the prior art.

SUMMARY

A gaze direction determination apparatus is provided, including a first camera, for capturing the nose thereof from above the nose, and a second camera for capturing at least a second person.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
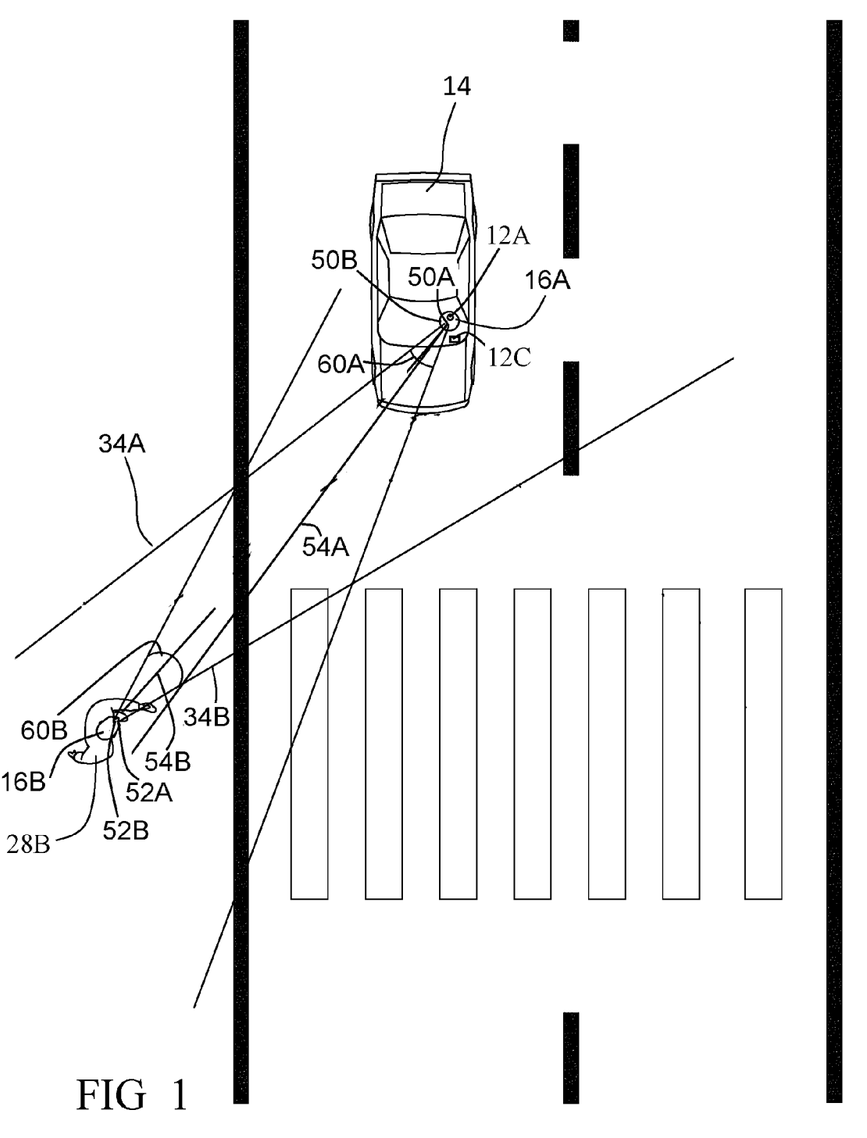
FIG. 1 is a top view of a vehicle and pedestrian.

FIG. 1 is a top view of a vehicle and pedestrian.

Suppose a vehicle 14 is disposed near a passage 53, and a pedestrian 28B has not yet started crossing the road.

The condition for allowing driving is that the driver views pedestrian 28B, and as well pedestrian 28B views driver 28A.

The term "camera" refers herein to a camera, radar, heat sensor, or any other capturing means.

This is determined by determining the angle of the head 16A of the driver by camera 12A, and by determining the angle of the head 16B of pedestrian 28B by camera 12B.

In the example of FIG. 1, the driver's head is directed towards pedestrian 28B and the pedestrian's head is directed towards the driver's head.

Figure 2:
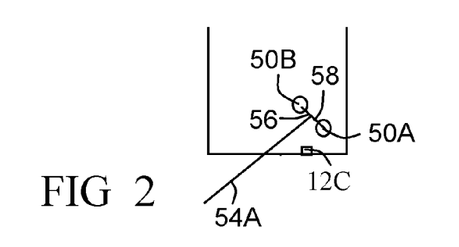
FIG. 2 depicts the determination that the driver's head is directed towards the pedestrian and that the pedestrian's head is directed towards the driver.

FIG. 2 depicts the determination that the driver's head is directed towards pedestrian 28B and that the pedestrian's head is directed towards the driver.

The driver's head is directed towards line 54A being right angled 56 to the line 58 between eye 50A and 50B.

Referring again to FIG. 1, even though line 54A misses pedestrian 28B, the driver's view 34A is angle 60A surrounding line 54A, thus the driver indeed views pedestrian 28B.

The determination of the pedestrian's view 34B is line 54B surrounded by angle 60B, being equal to angle 60A.

Upon the determining that the driver views pedestrian 28B, and that pedestrian 28B views the driver, the system may produce a request to the driver to allow pedestrian 28B to cross the road.

Figure 3:
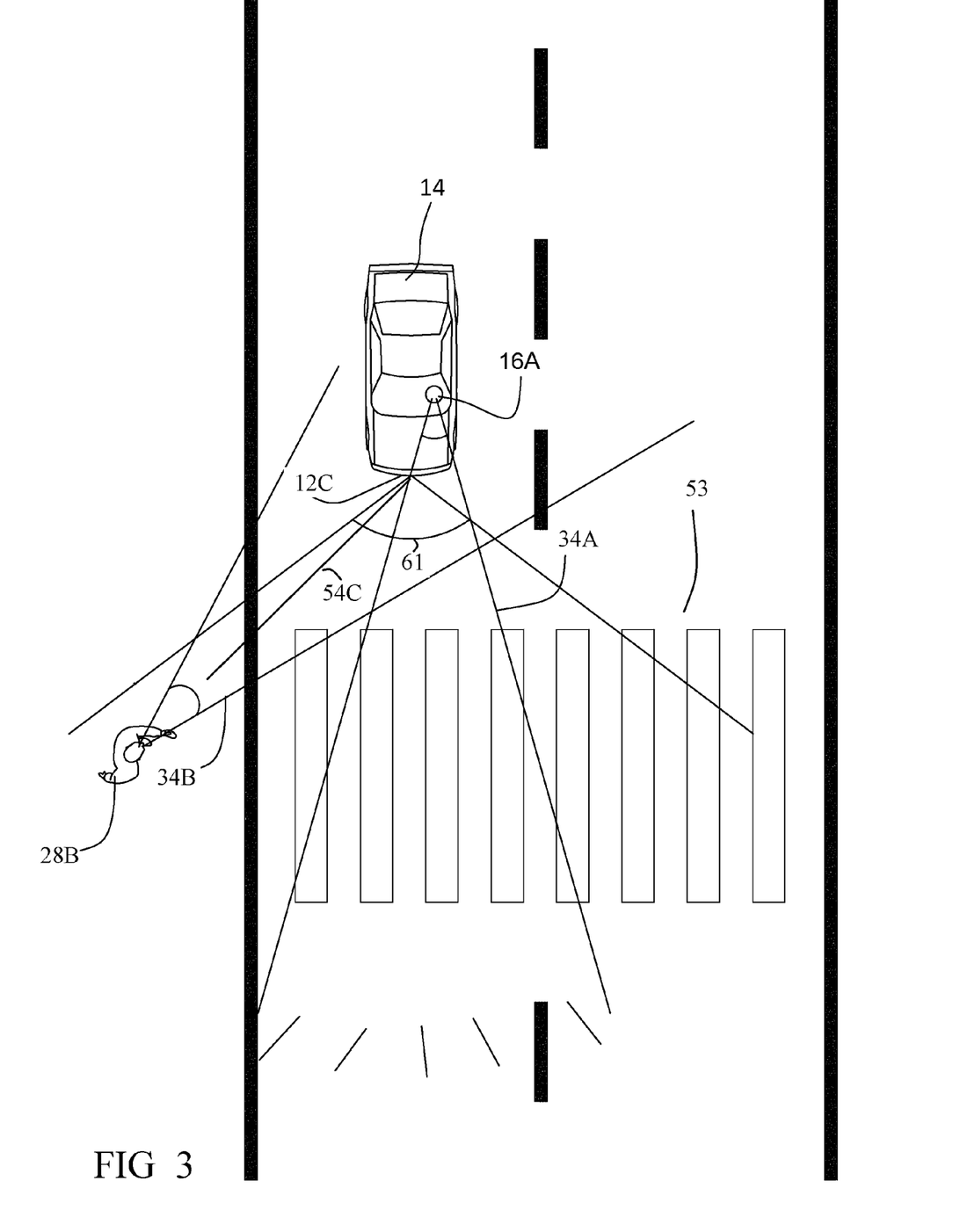
FIG. 3 depicts the determination that the driver's head is not directed towards the pedestrian and that the pedestrian's head is directed towards the driver.

FIG. 3 depicts the determination that the driver's head is not directed towards pedestrian 28B and that the pedestrian's head is directed towards the driver.

In this case neither driver 28A, nor pedestrian 28B is allowed to advance.

Figure 4:
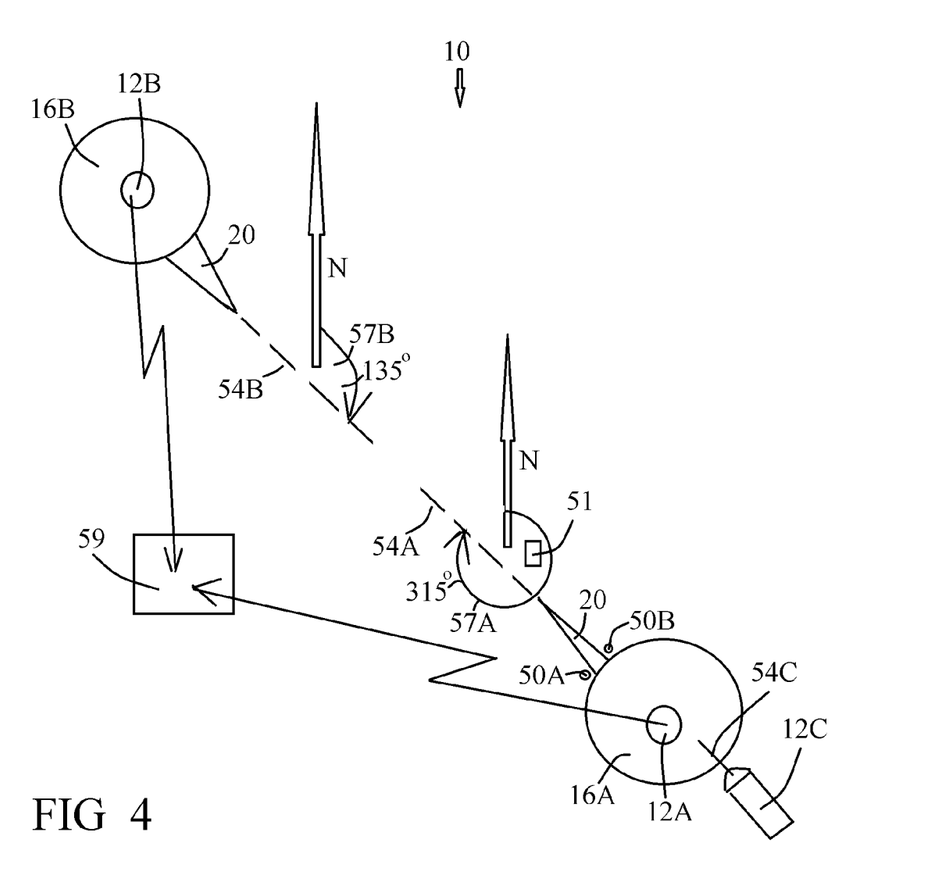
FIG. 4 is a schematic top view describing the determination that the driver's head is directed towards the pedestrian and that the pedestrian's head is directed towards the driver's head.

FIG. 4 is a schematic top view describing the determination that the driver's head is directed towards the pedestrian and that the pedestrian's head is directed towards the driver's head.

Nose 20 of driver's head 16A is directed to line 54A being right angled 56 to the line 58 between eye 50A and 50B. Thus, camera 12A is disposed above head 16A of the driver, for capturing nose 20 thereof. Camera 12A is accompanied by an electronic compass 51, for determining absolute angle 57A of nose 20, being in the example 315 degrees in relation to the absolute North, thus to convert non-absolute angle obtained from camera 12A to absolute angle.

Nose 20 of the pedestrian's head 16B is directed to line 54B. Camera 12B is disposed above head 16B of the pedestrian for capturing nose 20 thereof for determining absolute angle 57B thereof, being in the example 135 degrees in relation to the absolute North.

Figure 5:
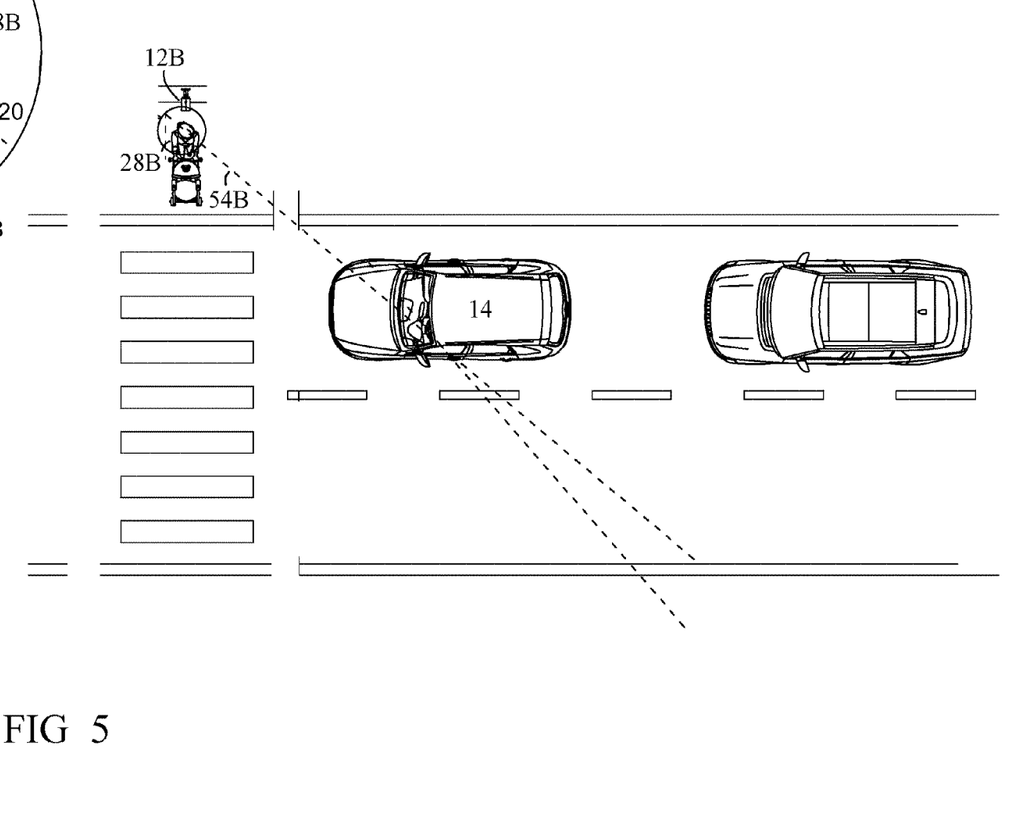
FIG. 5 is an example of FIG. 4.

FIG. 5 is an example of FIG. 4.

Figure 6:
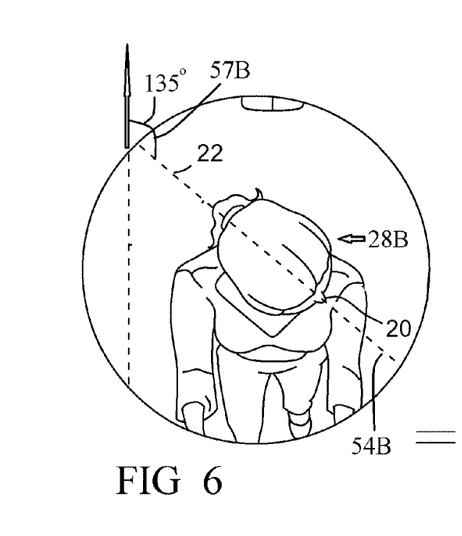
FIG. 6 enlarges the pedestrian of FIG. 5.

FIG. 6 enlarges the pedestrian of FIG. 5.

The 315 degrees of line 54A, and 135 degrees of line 54B meet the same line, since the difference therebetween is 315−135=180 degrees, expressing that line 54A of one nose is directed towards line 54B of the other nose. This meeting of lines 54A and 54B determines that the driver's eyes are directed towards the pedestrian's eyes and that the pedestrian's eyes are directed towards the driver's eyes, thus human communication between the persons is present.

The meeting lines 54A and 54B is not accurate, but rather considers the driver's angle of view surrounding line 54A and the pedestrian's angle of view surrounding line 54B.

Thus, and referring again to FIG. 1, even though line 54A slightly misses line 54B, the driver's angle of view surrounding line 54A and the pedestrian's angle of view surrounding line 54B should be considered to determine that the driver yet views pedestrian 28B.

The term "above" regarding disposition of the camera above the head need not be accurate, and may include horizontal shifting, as shown in FIG. 6.

Capturing of noses 20 from above simplifies the angles determination and the software calculations therefor. Thus, cameras 12A and 12B may not require entire image processing of the face, but rather may isolate the noses shape as protruding. Thus, cameras 12A and 12B may include heat sensors only, since the optical resolution requiring the capturing the nose's angle is resolution.

Figure 7:
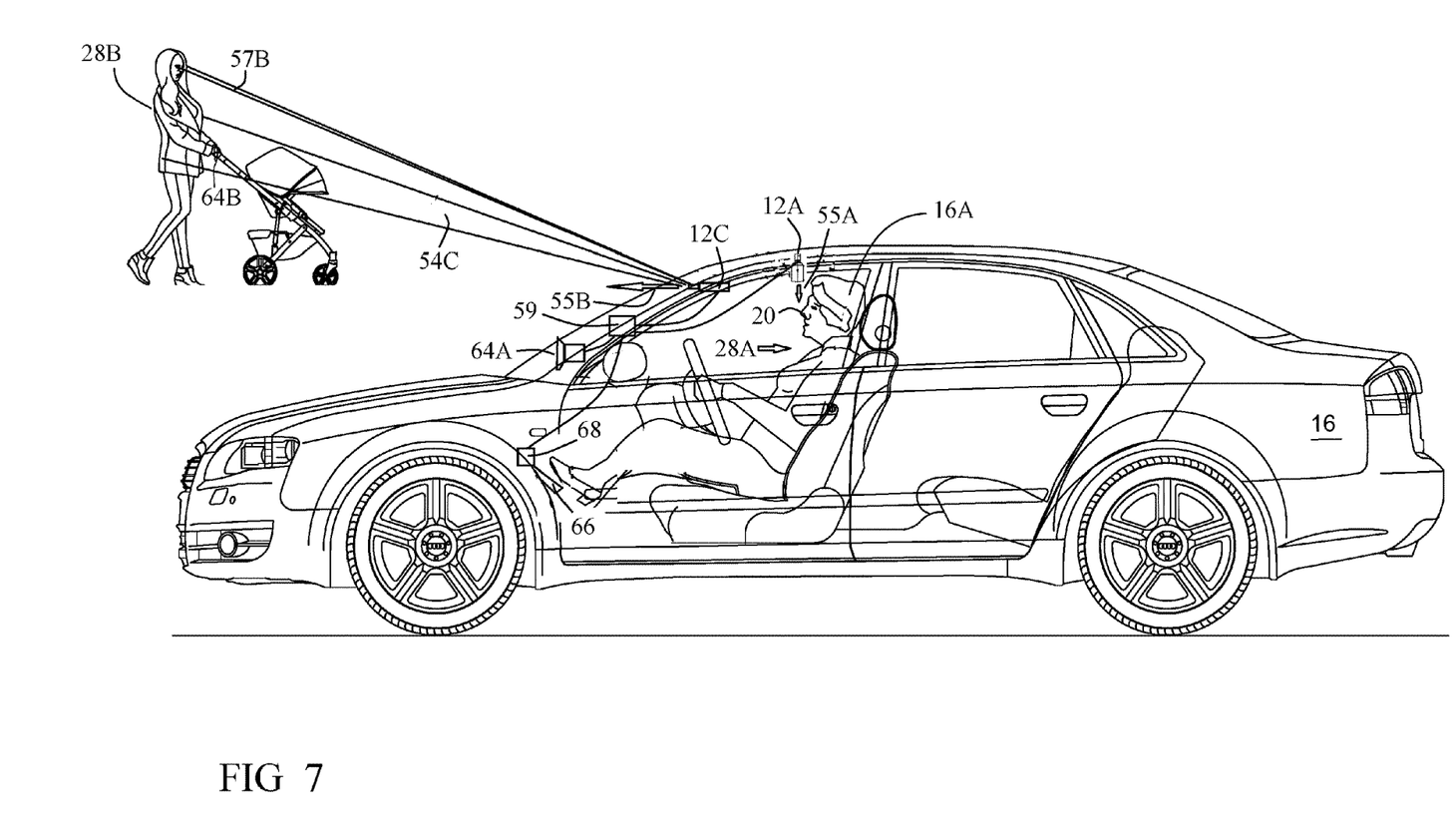
FIG. 7 is a side view showing the camera's disposition above the driver's head, for determining the nose's angle.

FIG. 7 is a side view showing the camera's disposition above the driver's head, for determining the nose's angle.

Camera 12A is disposed at the ceiling of the vehicle's compartment, and being directed downwards 55A, for capturing driver's nose 20.

An additional camera 12C may be directed horizontally (55B), for capturing the body of pedestrian 28B and for determining direction 54C thereof.

Camera 12C directed horizontally may as well capture eyes or spectacles of pedestrian 28B, for determining angle 57B of the pedestrian's head and eyes. Camera 12C may include illumination or image heat for capturing at night.

Controller 59 which may be installed to the vehicle collects data from cameras 12A, 12B and 12C, and may further collect data from the brake circuit 68 inputted by the brake pedal 66 of the vehicle.

While controller 59 determines that eyes of the driver and of the pedestrian are not directed one towards the other, reporting means 64A, which may be visual or vocal, which may be installed to the vehicle, announces prohibition both to the driver and to the pedestrian to advance. Once controller 59 determines that eyes of the driver and of the pedestrian are directed one towards the other, and that brake circuit 68 inputs that the driver has braked brake pedal 66, then reporting means 64A may allow the pedestrian to advance.

The allowance to the pedestrian may be announced by a receiver 64B attached to the pedestrian, such as by a bracelet, watch, smart phone, via any application.

Referring again to FIG. 4, horizontal direction 54A of the driver's nose 20 must be the horizontal direction 54C for which camera 12C captures pedestrian 28B.

Figure 8:
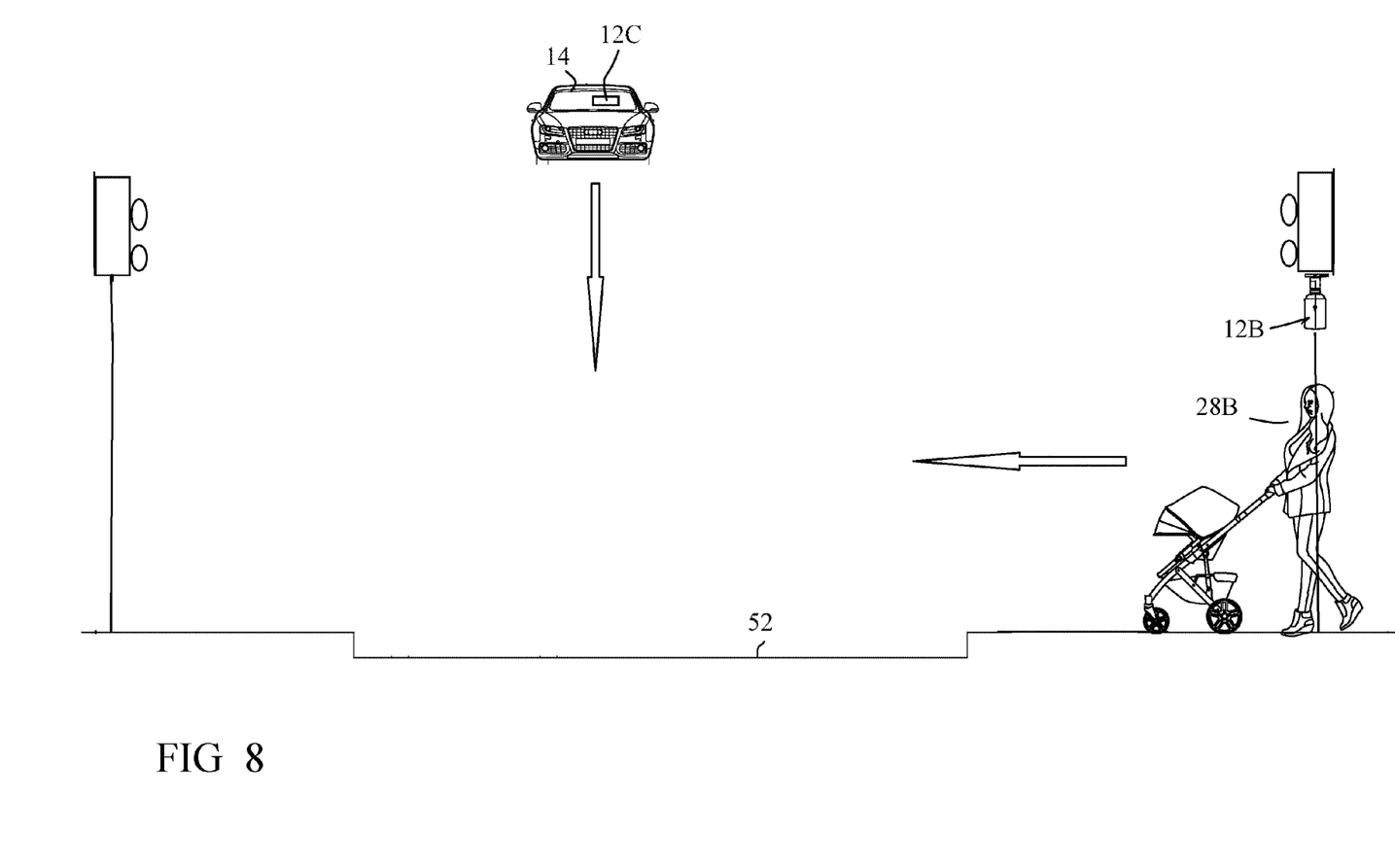
FIG. 8 is a side view showing the camera's disposition above the pedestrian's head, for determining the nose's angle.

FIG. 8 is a side view showing the camera's disposition above the pedestrian's head, for determining the nose's angle.

Rather than camera 12C attached to vehicle 14 for capturing the eyes of pedestrian 28B, a camera 12B may be disposed sufficiently high for capturing noses of all pedestrians; or a plurality of cameras 12B may be disposed above passage 53.

Upon determining that noses of the driver and pedestrian are directed one towards the other, reporting means 64A, which may be attached to the vehicle, may allow the driver or to the pedestrian to advance.

Figure 9:
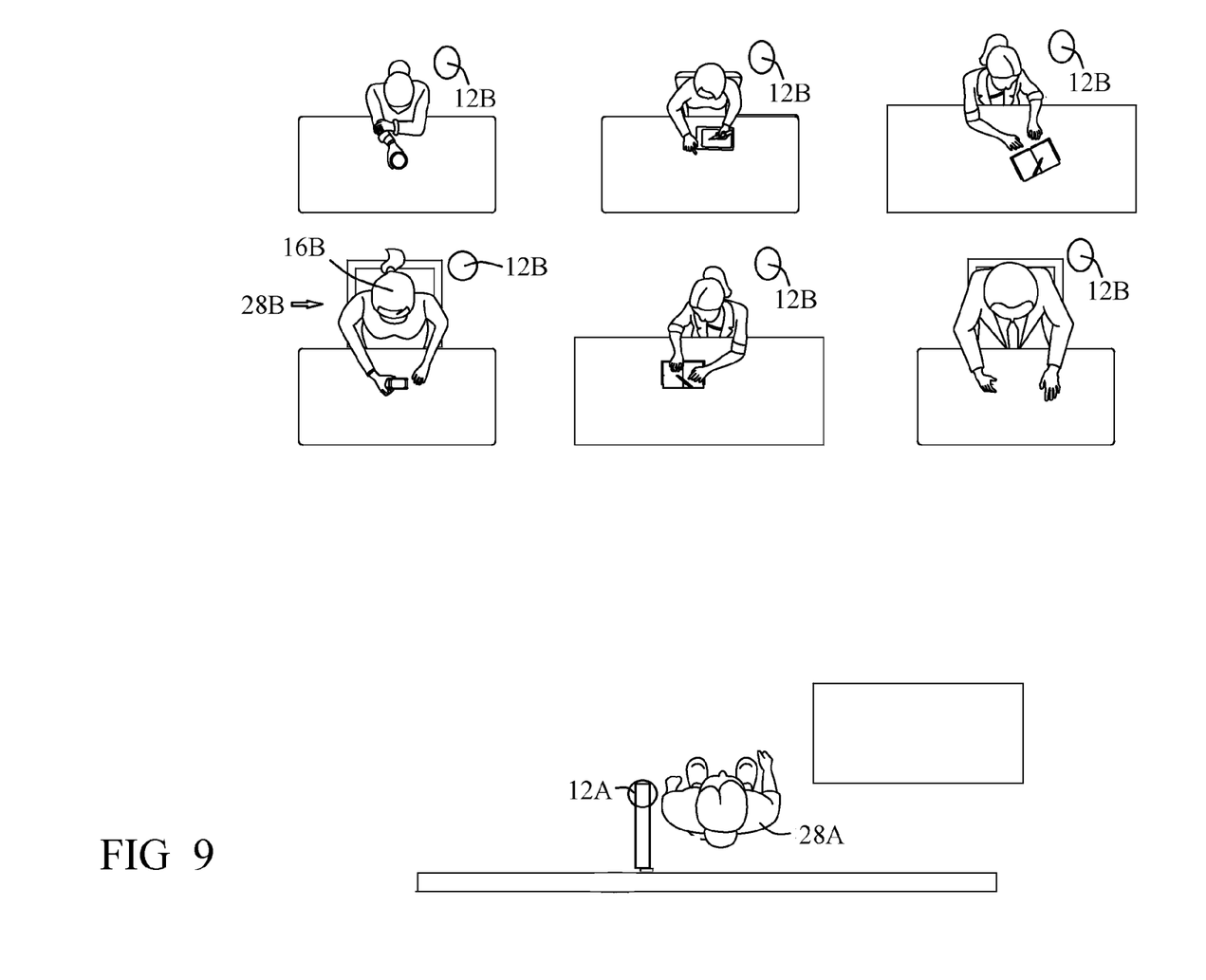
FIG. 9 is a top view of the apparatus applied for a lecturer and students.

FIG. 9 is a top view of the apparatus applied for a lecturer and students.

The apparatus may be applied for examining a teacher or lecturer regarding the concentration being level of listening thereto, via the level of eye contact between the lecturer and the students.

Thus, in one aspect, the invention is directed to a gaze direction determination apparatus (10), including at least one camera for determining gaze direction of at least one person, the apparatus characterized by including:

In the figures and/or description herein, the following reference numerals (Reference Signs List) have been mentioned:

numeral 10 denotes the according to one embodiment of the invention;
numeral 10 denotes the traffic allowance system according to one embodiment of the invention;
12A, 12B, 12C: cameras;
14: vehicle;
16A: driver's or lecturer's head;
16B: pedestrian's or student's head;
28A: driver or lecturer or another person;
28B: pedestrian or student or another person;
34A: driver's view;
34B: pedestrian's view;
50A,50B: drivers' eyes;
51: compass;
52A,52B: pedestrian's eyes;
53: passage;
54A: center of driver's view as determined by camera 12A;
54B: center of pedestrian's view as determined by camera 12B;
54C: direction of pedestrian 28B in relation to driver 28A, as determined by camera 12C;
55A: vertical directing of cameras 12A, 12B, 12C;
55B: horizontal directing of camera 12C;
56: right angle;
57A: angle in relation to the absolute North, of nose 20 of driver's head 16A;
57B: angle in relation to the absolute North, of nose 20 of pedestrian's head 16B;
58: line between drivers' eyes;
59: controller including image processor;
60A: angle surrounding driver's center of view;
60B: angle surrounding pedestrian's center of view;
61: horizontal angle range of camera 12C;
64A: reporting means, being visual or vocal or transmittance;
64B: receiver for receiving the report of transmitter 64A;
66: brake pedal;
68: brake circuit;

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. A gaze direction determination apparatus, comprising:
first capturing means disposed at a first specific known location, for capturing a head of a driver within a vehicle;

at least second capturing means disposed at a second specific known location, for capturing at least a head of at least a second person;

third capturing means for being installed near said driver and being directed horizontally, for capturing a body of said at least said second person; and a controller
for processing captures of said first capturing means, for determining from said captures' processing that eyes of said driver are horizontally directed towards at least a second person, and for determining human communication in case determining from said captures' processing that said eyes of said driver and eyes of said at least second person are horizontally directed one towards the other; and reporting means, wherein said first capturing means is installed above said driver and is directed vertically downwards, for capturing a nose thereof from above said nose, thereby determining a horizontal angle of said nose, for applying said determining that the eyes of said driver are horizontally directed to the eyes of said at least second person, and wherein in case of said determination that the eyes of said driver and the eyes of said at least second person are horizontally directed one towards the other, and that a brake circuit of the vehicle inputs that the driver has braked a brake pedal of the vehicle, then said controller is configured to control said reporting means to announce advancing allowance to said at least a second person, wherein said horizontal angle of said nose, and a horizontal direction of at least the second person as captured by the third capturing means, must be equal for applying said determining that the eyes of said driver are horizontally directed to the eyes of said at least second person.

2. The gaze direction determination apparatus according to claim 1, wherein said at least second capturing means is installed above said at least second person and is directed vertically downwards, for capturing at least one nose of said at least second person from above said second person's nose, thereby said determining human communication is only in case said nose of said driver as captured from above by said first capturing means, and said nose of said at least second person as captured from above by said at least second capturing means, are horizontally directed one towards the other.

3. The apparatus of claim 2, further comprising a compass for converting said determined horizontal angle to be absolute.

4. The gaze direction determination apparatus according to claim 1, wherein said at least second capturing means is directed vertically towards said at least second person.

5. The apparatus according to claim 1, wherein said first capturing means comprises heat sensors, for sensing locations of heat distributed from said nose.

\* \* \* \* \*